Jan. 1, 1952     G. B. ELLIS     2,580,415

PRIMARY CELL STRUCTURE

Filed Nov. 3, 1950

*INVENTOR.*
GRENVILLE B. ELLIS
BY
Harry M. Saragovitz
*Attorney*

Patented Jan. 1, 1952

2,580,415

UNITED STATES PATENT OFFICE 2,580,415

PRIMARY CELL STRUCTURE

Grenville B. Ellis, Red Bank, N. J., assignor to the United States of America as represented by the Secretary of the Army Application November 3, 1950, Serial No. 194,001

3 Claims. (Cl. 136—133)

(Granted under the act of March 3, 1883, as amended April 30, 1928; 370 O. G. 757)

The invention described herein may be manufactured and used by or for the Government for governmental purposes, without the payment of any royalty thereon.

This invention relates to primary cells and more particularly to an improved cell structure for hermetically sealing the elements of a primary alkaline dry type cell.

In primary cells of this type it is important that the creepage of the electrolyte within the cell be prevented or reduced to a minimum. It is also important that provision be made for the maximum electrical and chemical insulation between the internal elements of the cell and the structural compounds of the cell itself.

It is an object of the invention to provide an improved cell structure of injection molded thermo-plastic material, which simultaneously insulates the internal elements of the cell from each other and also hermetically seals said elements within the cell.

It is a further object of the invention to provide an improved light weight injection molded thermo-plastic casing for an hermetically sealed dry type alkaline dry cell which can be economically manufactured and assembled.

Other objects will become apparent from the following description of a preferred embodiment of the invention in this application to known alkaline dry cells comprising essentially as internal elements, an anode of amalgamated zinc or its equivalent, a cathode consisting of an electronically conductive mass of oxygen yielding components such as mercuric-oxide, silver oxide or the like, an ionically conductive barrier between said anode and cathode and an immobilized body of an aqueous alkaline metal hydroxide electrolyte initially containing a substantial quantity of alkaline metal in solution.

Figure 1:
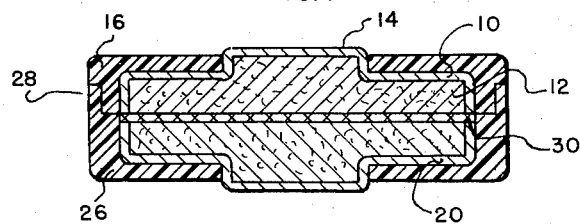
Fig. 1 is a vertical sectional view of a cell embodying one form of the present invention.
Figure 2:
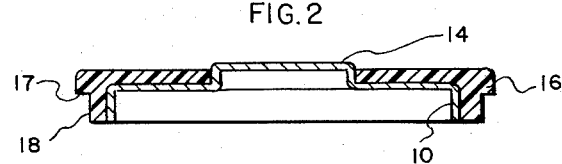
Fig. 2 is a vertical sectional view of the anodic element.
Figure 3:
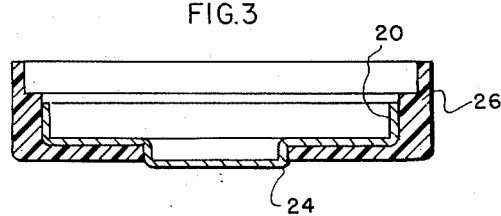
Fig. 3 is a vertical sectional view of the cathodic element.

The primary cell illustrated in the drawing comprises an injection molded metal insert 10, filled with anodic material and injection molded metal insert 20, filled with cathodic material and an ionically conductive barrier 30 disposed between them. Metal cup or insert 10, filled with the anodic material described hereinbefore has a nipple or projection 14 at its closed end in order to facilitate any metallic connections to be made to the cell.

A thin jacket 16 of plastic di-electric material such as polystyrene, methyl-methacrylate, ethylcellulose, nylon or other synthetic high polymers conventionally used for such purposes surrounds metal insert 10, leaving projection 14 exposed, and is firmly bonded thereto by the process known as injection molding.

Injection molding is particularly suitable because it enables the molding of thin walled articles such as metal insert 10 quickly and economically.

Plastic jacket 16, has a groove or slot 18 formed at the open edges of jacket 16, and an annular flange 17 formed as a part thereof.

A thin jacket 26, of plastic di-electric material similar to jacket 16 surrounds metal insert 20 and is firmly bonded thereto by the aforementioned process of injection molding. Metal insert 20 has a nipple or projection 24 at its closed end for the same purpose as projection 14.

Plastic jacket 26 extends longitudinally beyond the open edges of metal insert 20 a sufficient length to provide a firm fit at the rabbeted edges of jacket 16 and packet 20 and maintains barrier 30 in a rigid fixed position within the cell. The primary cell thus assembled is compressibly fitted at junction 28 and can either be heat sealed or cemented at junction 28 thus hermetically sealing the internal elements of the cell.

Ionically conductive carrier 30 substantially equal in diameter to the diameter of metal inserts 10, 20, consisting of, as is well known, a material which will allow rapid ionic flow, but prevent the flow of impurities from the depolarizer to the anode separates the cathodic material in insert 20 from the anodic material in metal insert 10.

The particular combination of features as defined in the appended claims proves a primary alkaline dry cell which can be rapidly and inexpensively manufactured from easily standard light weight sections, the plastic jackets electrically isolates the anodic and cathodic materials and eliminates the use of more complicated insulating means.

Production techniques are improved by the ability to make the two sections separately and which can be assembled together at some point in the line of production without contamination of either the anodic or cathodic materials.

What is claimed is:

1. A leak-resistant primary alkaline dry cell having a cathodic element, and anodic element and an ionically conductive barrier disposed between said elements, the first of said elements being housed in a first metal container, a first jacket of injection molded thermo-plastic insulating material firmly bonded to said first container, but leaving an exposed circuit terminal at the closed end thereof, said first jacket extending longitudinally beyond the edge portions of the open ends of said first metal container and forming a ledge laterally aligned with said edge portions, the second of said elements being housed in a second metal container, a second jacket of injection molded thermo-plastic insulating material firmly bonded to said second metal container, but leaving an exposed circuit terminal at the closed end thereof, the outer edge portions of said second material being extended longitudinally so as to make a firm fit with the longitudinally extended edges of said first material, said barrier being held in position on said ledge portion by said outer edge portions of said second material, and the outer edge portions of said first and said second material being thermoplastically sealed at their junctions whereby said elements are hermetically sealed within said material.

2. A leak-resistant primary alkaline dry cell having a cathodic element and an anodic element and an ionically conductive barrier disposed between said elements, the first of said elements comprising a first metal insert having a first injection molded thermo-plastic insulating material firmly bonded thereto, but leaving an exposed circuit terminal at the closed end thereof, said first material extending longitudinally beyond the edge portions of the open end of said first metal insert and forming a ledge laterally aligned with said edge portions, the second of said elements comprising a second metal insert having a second injection molded thermo-plastic material firmly bonded thereto, but leaving an exposed circuit terminal at the closed end thereof, the outer edge portions of said second material being longitudinally extended so as to make a firm fit with said longitudinally extended portions of said first material, said barrier being held in position on said ledge portions by said longitudinally extended edge portions of said second material and the outer edge portions of said first and second material being thermo-plastically sealed at their junctions whereby said material is hermetically sealed within said material.

3. A leak-resistant primary alkaline dry cell having a cathodic element, an anodic element and an ionically conductive barrier disposed between said elements, the first of said elements being housed in a first metal container, a first jacket of thermo-plastic insulating material firmly bonded to said first metal container but leaving an exposed circuit terminal at the closed end thereof, said first jacket being rabbeted at its open edges, the second of said elements being housed in a second metal container, a second jacket of thermo-plastic insulating material firmly bonded to said second metal container, but leaving an exposed circuit terminal at the closed end thereof, the open edges of said second jacket being rabbeted to receive the rabbeted edges of said first jacket, said barrier being disposed beyond said first and said second metal containers and said first and second jackets being thermo-plastically sealed at their junction whereby said elements are hermetically sealed within said jackets.

GRENVILLE B. ELLIS.

REFERENCES CITED

The following references are of record in the file of this patent:

UNITED STATES PATENTS

| Number | Name | Date |
|---|---|---|
| 2,346,640 | Anthony | Apr. 18, 1944 |
| 2,411,272 | Keller | Nov. 19, 1946 |
| 2,419,589 | Paul | Apr. 29, 1947 |
| 2,536,698 | Ruben | Jan. 2, 1951 |